(12) United States Patent
Liebrecht (10) Patent No.: US 6,301,863 B1
(45) Date of Patent: Oct. 16, 2001

(54) MULTI-BLADE CIRCUMROTATIONAL TRIMMER

(76) Inventor: Eugene J Liebrecht, 3020 SW. 86th Pl., Ocala, FL (US) 34476

( * ) Notice: Subject to any disclaimer, the term of this patent is extended or adjusted under 35 U.S.C. 154(b) by 0 days.

(21) Appl. No.: 09/444,893

(22) Filed: Nov. 22, 1999

(51) Int. Cl.⁷ ................................................. A01D 34/63
(52) U.S. Cl. .......................... 56/10.6; 56/12.7; 56/13.7; 56/17.4; 56/295
(58) Field of Search .................................. 56/10.7, 12.7, 56/13.6, 13.7, 17.4, 10.6, 13.5, 16.9, 255, 295

(56) References Cited

U.S. PATENT DOCUMENTS

| | | |
|---|---|---|
| 2,539,934 * | 1/1951 | Smith et al. . |
| 2,838,901 * | 6/1958 | Davis . |
| 3,508,384 * | 4/1970 | Madre . |
| 3,526,083 * | 9/1970 | Barry et al. . |
| 4,697,405 * | 10/1987 | DeWitt et al. . |
| 4,756,147 | 7/1988 | Savell . |
| 5,287,683 | 2/1994 | Smith . |
| 5,309,701 | 5/1994 | McGuerty . |
| 5,313,770 | 5/1994 | Smothers . |
| 5,471,824 * | 12/1995 | Neely . |
| 5,694,752 * | 12/1997 | Warfield, III . |
| 5,715,667 * | 2/1998 | Goman et al. . |

* cited by examiner

*Primary Examiner*—H. Shackelford
(74) *Attorney, Agent, or Firm*—Michael I. Kroll

(57) ABSTRACT

The present invention discloses a 360 degree rotatable trimmer assembly 10 mounted on the side of a conventional lawn tractor 12 having a plurality of cutting members 26, 92 mounted onto a platform 70 being connected to a motorized rotatable shaft 50 by a plurality of belts 32 and pulleys 34. A bumper guard ring is 28 provided above each cutting member 26, 92 to act as a guide around obstacles such as trees and poles 16. A multiple lobed cam member 56 having a communicating cam roller 78 is provided for properly re-positioning the platform 70 following rotation of the platform around an object 16. A gasoline motor 24 and alternatively a hydraulic motor 104 are disclosed for providing power to the rotatable shaft 50.

15 Claims, 8 Drawing Sheets

MULTI-BLADE CIRCUMROTATIONAL TRIMMER

BACKGROUND OF THE INVENTION

1. Field of the Invention

The present invention relates generally to line trimming devices and, more specifically, to a device having a plurality of cutting members being mounted onto a frame and connected to a motorized central shaft by a number of pulleys and belts and wherein said frame is rotatable around said central shaft.

The cutting members are comprised of a rotatable shaft being mounted to the periphery of a rotatable frame and having a pulley attached thereon that is connected by a belt to a central motorized shaft providing means for rotating said cutting member shaft and wherein said cutting member shaft has a rigid cutting blade attached thereto and said blade having a length of flexible line attached thereon whereby when said cutting member shaft is rotated the circumference of the rigid blade will be exceeded by the circumference of the attached rotating flexible line.

Further each cutting member has a guard ring mounted over the rigid blade being of substantially similar diameter as the rigid blade.

When a cutting member encounters a stationary object the cutting member guard ring will prevent the stationary object from making contact with the rigid blade as the stationary object causes the cutting member's frame to rotate. As the cutting member passes the stationary object the flexible line attached to the rigid blade, having a rotatable circumference greater than the guard ring, will trim the vegetation from said stationary object whether said stationary object is basically round, such as pipes, flag poles, and trees or rectangular, such as, fence posts.

Still further said device having height adjustment means can easily be positioned whereby one of the cutting members can travel beneath fencing rails thereby removing vegetation until encountering a fence post whereupon said cutting member will trim said vegetation from said fence post as it is rotated away from said fence post and another cutting member rotates into position under said fence rails until encountering another fence post whereupon the process is repeated.

In addition, another embodiment has been provided wherein said device can be incorporated into the hydraulic system of a motorized vehicle such as a tractor.

2. Description of the Prior Art

There are other line trimmer housing attachments designed to convert line trimmers to wheeled cutting assemblies. Typical of these is U.S. Pat. No. 5,287,683 issued to Smith on Feb. 22, 1994.

Another patent was issued to Savell on Jul. 12, 1988 as U.S. Pat. No. 4,756,147. Yet another U.S. Pat. No. 5,309,701 was issued to McGuerty on May 10, 1994 and still yet another was issued on May 24, 1994 to Smothers as U.S. Pat. No. 5,313,770.

U.S. Pat. No. 5,287,683

Inventor: Walker M. Smith

Issued: Feb. 22, 1994

A line trimmer is converted to a lawn trimmer/mower so that it can be used to mow areas of grass like a conventional mower; however, the line trimmer retains its functionality as a line trimmer and edger. The conversion device is a wheeled platform that holds the cutting assembly at a specified height above a lawn. The platform has an opening in its forward portion for the intake of grass and weeds and the exhaust of clippings. The opening also serves the functions of allowing the user to see the cutting line to determine when more should be advanced, allowing the line trimmer to be moved next to objects in a lawn for trimming weeds and grass, and allowing the line trimmer to be rotated to a horizontal orientation where edging can be performed. The wheels are preferably multidirectional so that the line trimmer can be swept across the lawn in a semi-circular pattern. Locking mechanisms associated with the wheels allow the sweeping motion to be performed more comfortably and quickly. A means is provided for orienting the shaft of the line trimmer at different locations relative to the opening in the platform so that the platform can be comfortably moved back and forth parallel to a wall or fence.

U.S. Pat. No. 4,756,147

Inventor: Kenneth J. Savell

Issued: Jul. 12, 1988

A conventional hand-held weed trimmer of the type including a motor with a flexible cutting line fixed to the output of the motor is provided with a carriage for converting the trimmer into a wheel-mounted lawnmower. The lawnmower consists of a wheel-mounted planar deck having an open interior portion for receiving the housing of the weed trimmer, and means for supporting the lower skirt portion and protective shield of the motor housing below the plane of the deck. The supporting means comprises means for clamping the rear portion of the skirt to the deck, and a toe piece for supporting the front portion of the skirt. The deck, or at least the bottom flange of the toe-piece, is flexible enough to allow the forward portion of the trimmer to be tilted downwardly when a downward force is exerted on the trimmer housing. In a first embodiment of the invention, the deck of the carriage is essentially circular, with a key shaped aperture formed therein. In a second embodiment, the deck comprises a frame made up of a plurality of bars.

U.S. Pat. No. 5,309,701

Inventor: Frank J. McGuerty

Issued: May 10, 1994

A conventional four wheeled lawn motor carriage having a vertically mounted electric motor with flexible cutting, lines attached to the bottom end of the motor axial drive shaft. A hand lever is attached to the electric motor enabling the electric motor to rotate from a vertical position to a transverse horizontal position wherein the flexible cutting lines rotate in a vertical plane parallel to and outside of the carriage.

U.S. Pat. No. 5,313,770

Inventor: Odis B. Smothers

Issued: May 24, 1994

A rotary weed cutter or trimmer establishes two cone shaped guard volumes about the drive shaft to prevent weeds or vines, whether cut or uncut, from wrapping around the shaft during operations. A motor-driven weed cutting machine drives a main filament spool mounted on the drive shaft. When the spool is rotated at high speed by the motor the filaments a conventional cutting plane. An auxiliary spool is employed to create a guard zone comprising two cone shaped guard volumes coaxial with the drive shaft. The auxiliary spool is mounted on the shaft between the main spool and the frame of the machine. The hub of the auxiliary spool defines a central orifice to accommodate the shaft. An upper disk and a lower disk extend from the hub. A plurality of holes are drilled about the periphery of the disks. Cutting line or braided wire is disposed through the holes. Each of the bitter ends of the line or wire are left unanchored to provide cutting action in the vicinity of the shaft. When rotated at high speeds the auxiliary spool's cutting lines create an impenetrable guard zone about the drive shaft that cannot be traversed by weeds or the like.

While these line trimmer attachments may be suitable for the purposes for which they were designed, they would not be as suitable for the purposes of the present invention, as hereinafter described.

SUMMARY OF THE PRESENT INVENTION

The present invention discloses a 360 degree rotatable trimmer assembly mounted on the side of a conventional lawn tractor having a plurality of cutting members mounted onto a platform being connected to a motorized rotatable shaft by a plurality of belts and pulleys. A bumper guard ring is provided above each cutting member to act as a guide around obstacles such as trees and poles. A multiple lobed cam member having a communicating cam roller is provided for properly re-positioning the platform following rotation of the platform around an object. A gasoline motor and alternatively a hydraulic motor are disclosed for providing power to the rotatable shaft.

A primary object of the present invention is to provide a multi-cutting member trimmer device.

Another object of the present invention is to provide a multi-cutting member trimming device wherein said cutting members are attached to a rotatable platform.

Yet another object of the present invention is to provide a multi-cutting member trimming device wherein each cutting member has a rigid blade having an amount of flexible line affixed thereon and reaching beyond the periphery of the rigid blade.

Still yet another object of the present invention is to provide a multi cutting member trimming device wherein each cutting member has a rigid blade having an amount of flexible line affixed thereon and reaching beyond the periphery of the rigid blade and having a guard ring to prevent contact with the rigid portion of the cutting blade.

Yet another object of the present invention is to provide a multi-cutting member trimming device which can be selectively attached to a wheeled carriage device such as a lawn mower.

Additional objects of the present invention will appear as the description proceeds.

The present invention overcomes the shortcomings of the prior art by providing a device having a plurality of cutting members mounted onto a frame and connected to a motorized central shaft by a number of pulleys and belts and wherein said frame is rotatable around said central shaft.

Each cutting members being comprised of a rotatable shaft mounted to the periphery of a rotatable frame and having a pulley attached thereon connected by a belt to a central motorized shaft for rotating said cutting member shaft and wherein said cutting member shaft has a rigid blade attached thereto and a length of flexible line attached thereon whereby when said cutting member shaft is rotated the circumference of the rigid blade will be exceeded by the circumference of the attached rotating flexible line and each cutting member has a guard ring to prevent access to the rigid blade.

In addition, another embodiment is provided wherein said device can be incorporated into the hydraulic system of a motorized vehicle such as a tractor.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

LIST OF REFERENCE NUMERALS

With regard to reference numerals used, the following numbering is used throughout the drawings:
- 10 present invention
- 12 lawn tractor
- 14 grass
- 16 flag pole
- 18 operator
- 20 motor handle
- 22 hand
- 24 motor
- 26 blades
- 28 bumper ring
- 30 drive belt system
- 32 drive belt
- 34 pulley
- 36 belt tensioner
- 38 trimmer
- 40 trimmer mounting shalt
- 42 main drive pulley
- 46 height control handle
- 48 height control assembly
- 50 motor drive shaft
- 52 direction arrow
- 54 mounting means
- 56 cam
- 58 cam lobe
- 60 inner shaft
- 62 tensioning means
- 64 first attachment means
- 66 second attachment means
- 70 platform
- 72 means for rotatably mounting
- 74 means for rotatably mounting
- 76 cam stop
- 78 roller
- 80 roller attaching means
- 82 roller plate
- 84 plate spring
- 86 alternative motor bracket
- 88 motor base plate
- 90 motor mounting means
- 92 flexible trimmer cord
- 94 blade shaft
- 96 means for attachment
- 98 fastener
- 100 hydraulic pump
- 102 tractor engine
- 104 hydraulic motor
- 106 fluid connecting means
- 108 belt drive system
- 110 tensioning spring
- 112 coupling means
- 114 pivot means
- 116 collar
- 118 mounting plate
- 120 fastener

DESCRIPTION OF THE PREFERRED EMBODIMENT(S)

In order that the invention may be more fully understood, it will now be described by way of example, with reference to the accompanying drawings in which FIGS. 1 through 8 illustrate the present invention being a multi-blade 360 degree rotatable trimmer attachment for a lawn tractor.

Figure 1:
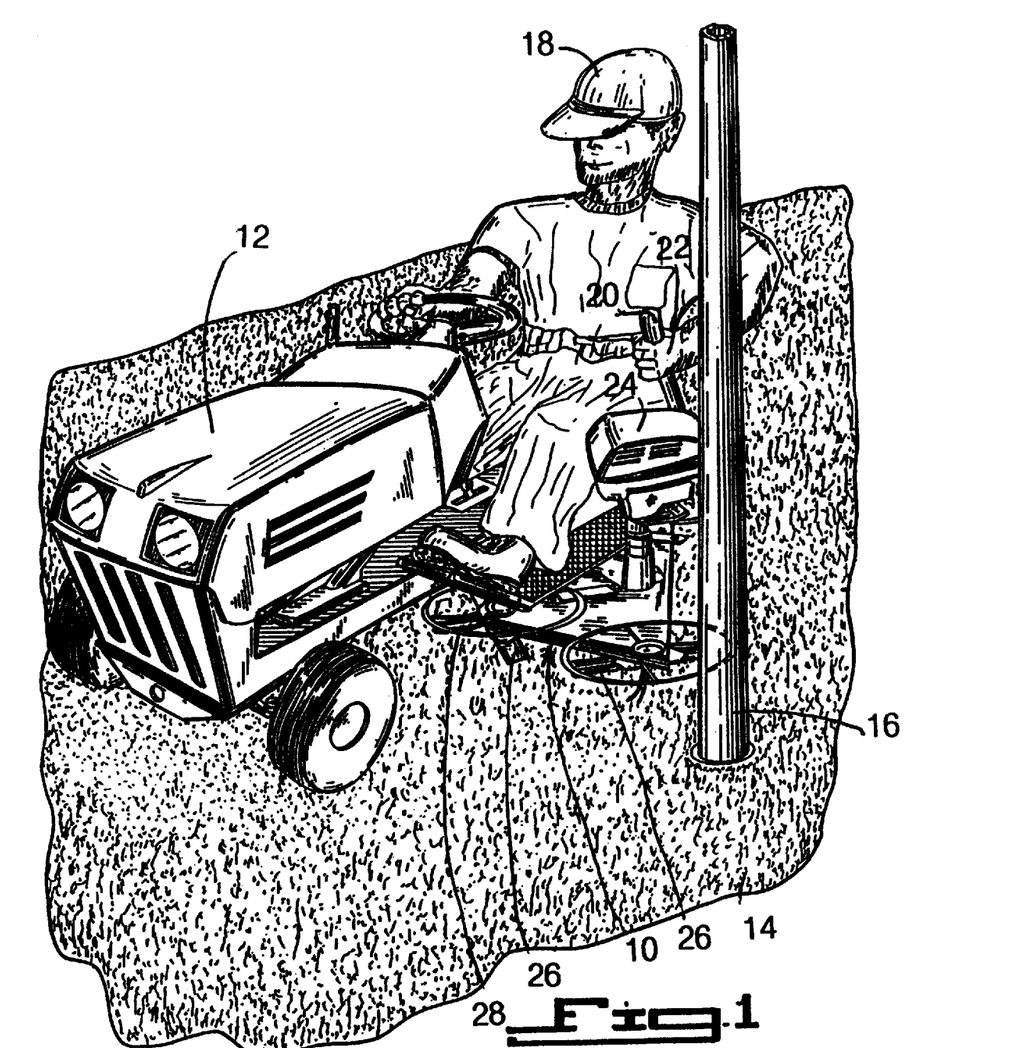
FIG. 1 is a perspective view of a lawn tractor equipped with a trimmer arrangement according to the present invention and being utilized to trim grass and ground cover in proximity to a flag pole.

Turning to FIG. 1, shown therein is a perspective view of a lawn tractor 12 equipped with a trimmer arrangement according to the present invention 10 and being utilized to trim grass and ground cover 14 in proximity to a flag pole 16. Also shown is an operator 18 grasping the motor handle 20 by hand 22 along with motor 24. The 360 degree rotatable trimmer arrangement 10 has a multiple bladed cutter platform attached to the side of tractor 12. The trimmer 10 shows three cutting blades 26 having a bumper ring 28 mounted so that the bumper ring will first contact an obstacle, e.g., a flat pole 16, prior to blades 26 and direct the blade 26 around the pole 16.

Figure 1A:
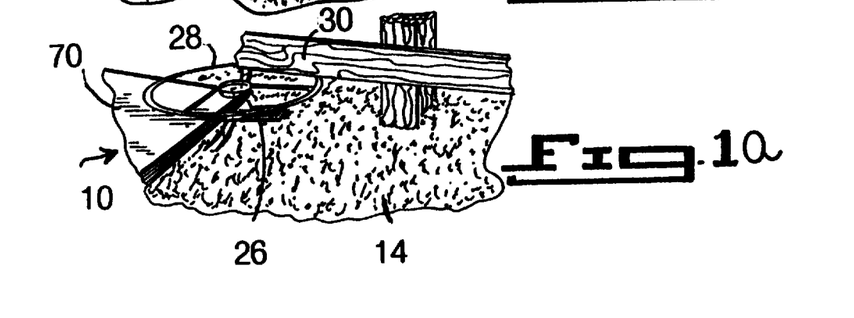
FIG. 1A is a fragmentary perspective view of a part of the trimmer arrangement showing its use and ability to trim ground cover under and around a fence rail.

Turning to FIG. 1A, therein is shown is a fragmentary perspective view of a part of the trimmer arrangement 10 showing a bumper ring 28 and its use and ability to trim ground cover 14 under and around a fence rail 30 along with platform 70 and blade 26.

Figure 2:
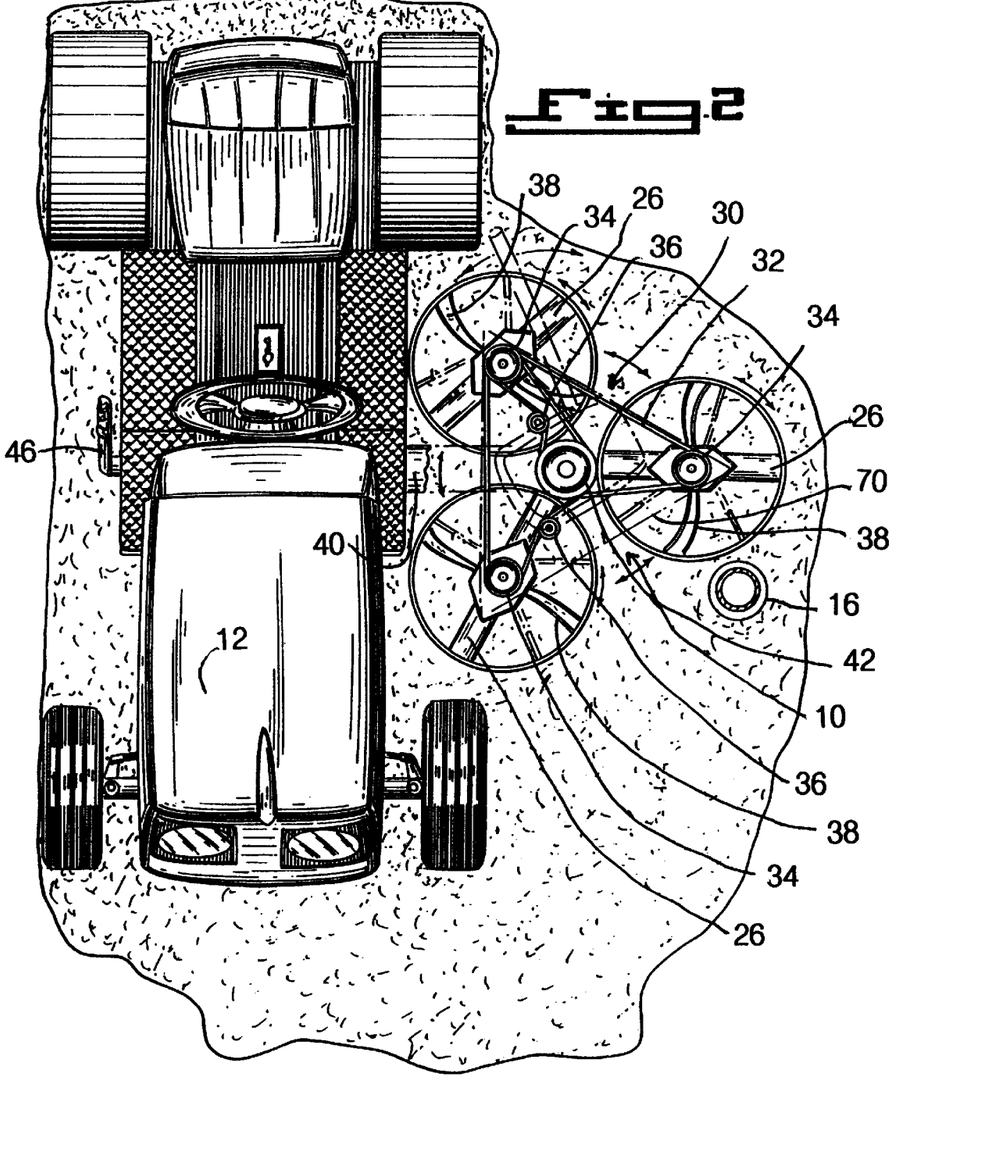
FIG. 2 is a top plan view of the driving belt system of the trimmer arrangement showing the belts, pulleys and the like cooperatively engaged with the cutting blades and trimmers and having some parts removed and others shown in phantom lines for clarity.

Turning to FIG. 2, shown therein is a top plan view of the drive belt system 30 of the trimmer arrangement 10 showing the multiple drive belts 32, pulleys 34 and belt tensioning members 36 cooperatively engaged with the multiple cutting blades 26 and trimmers 38 and having some parts removed and others shown in phantom lines for clarity. Also shown is tractor 12 having a means for connecting the platform to the tractor 12 being a trimmer mounting shaft 40 mounted transversely on the underside of the tractor with trimmer elevation or height control handle 46 mounted thereon. Handle 46 is used to raise and lower the trimmer assembly 10 and thereby adjust its height. Main rotatable drive shaft and pulley 42 is shown slightly offset from the center of the triangular trimmer platform 70 with each blade assembly 26 having its own pulley 34 with blades 26 mounted on the edge of the platform in the corners of the triangle. When the blade assembly 26 nearest to the pole 16 hits the pole, the blade assembly will rotate counterclockwise which will allow the tractor 12 to continue forward thereby avoiding stopping the tractor or otherwise maneuvering the tractor around the pole.

Figure 3:
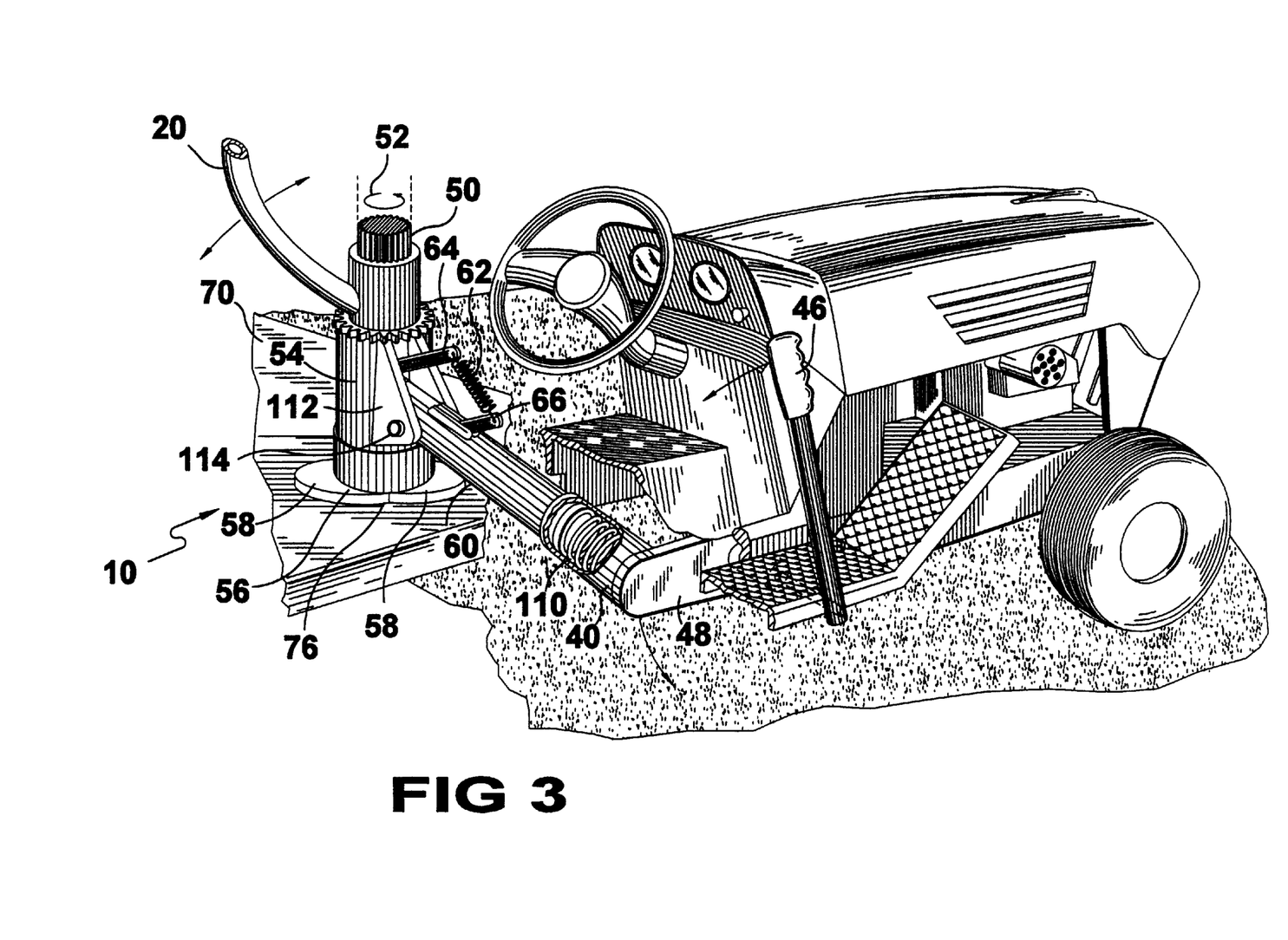
FIG. 3 is a perspective view of a portion of the trimmer arrangement and its associated connector to the height adjustment controls on a typical lawn tractor upon which the trimmer can be mounted.

Turning to FIG. 3, shown therein is a perspective view of a portion of the trimmer arrangement 10 and its associated connecting shaft 40 to the conventional height adjustment controls 46 and height control assembly 48 on a typical lawn tractor 12 upon which the trimmer 10 can be mounted. Also shown is a portion of the rotatable motor drive shaft 50 with direction arrow 52 along with motor handle 20. The motor drive shaft 50 passes downwardly on the interior of a hollow vertical mounting means 54 having a bore therein, further having a multiple lobed cam 56 with lobes 58 and a position stop or trough 76 for receiving a cam roller (not shown) shown thereon. Means 54 also provides means for fixedly mounting the motor to platform 70. The cam assists in properly positioning the rotatable trimmer 10 as will be described hereinafter. Also shown is the inner shaft 60 which is slidably mounted interior of shaft 40 having a spring tensioning means 110 for urging inner member 60 outwardly from shaft 40 whereby the trimmer 10 can be moved laterally in the horizontal plane toward and away from tractor 12 with spring 110 urging trimmer 10 away from the tractor. Vertical mounting means 54 is pivotally coupled to shaft 60 by means 112 having a pivoting means 114, e.g., a nut and bolt, which passes through shaft 60 and sandwiches coupling 112 about the terminal end of shaft 60 further having a spring tensioning means 62 with attaching means showing a first attaching means 64 to the vertical mounting means 54 and a second attachment means 66 whereby spring 62 biases platform 70 upwardly away from the horizontal toward a rotated vertical position which is controlled by handle 20.

Figure 4:
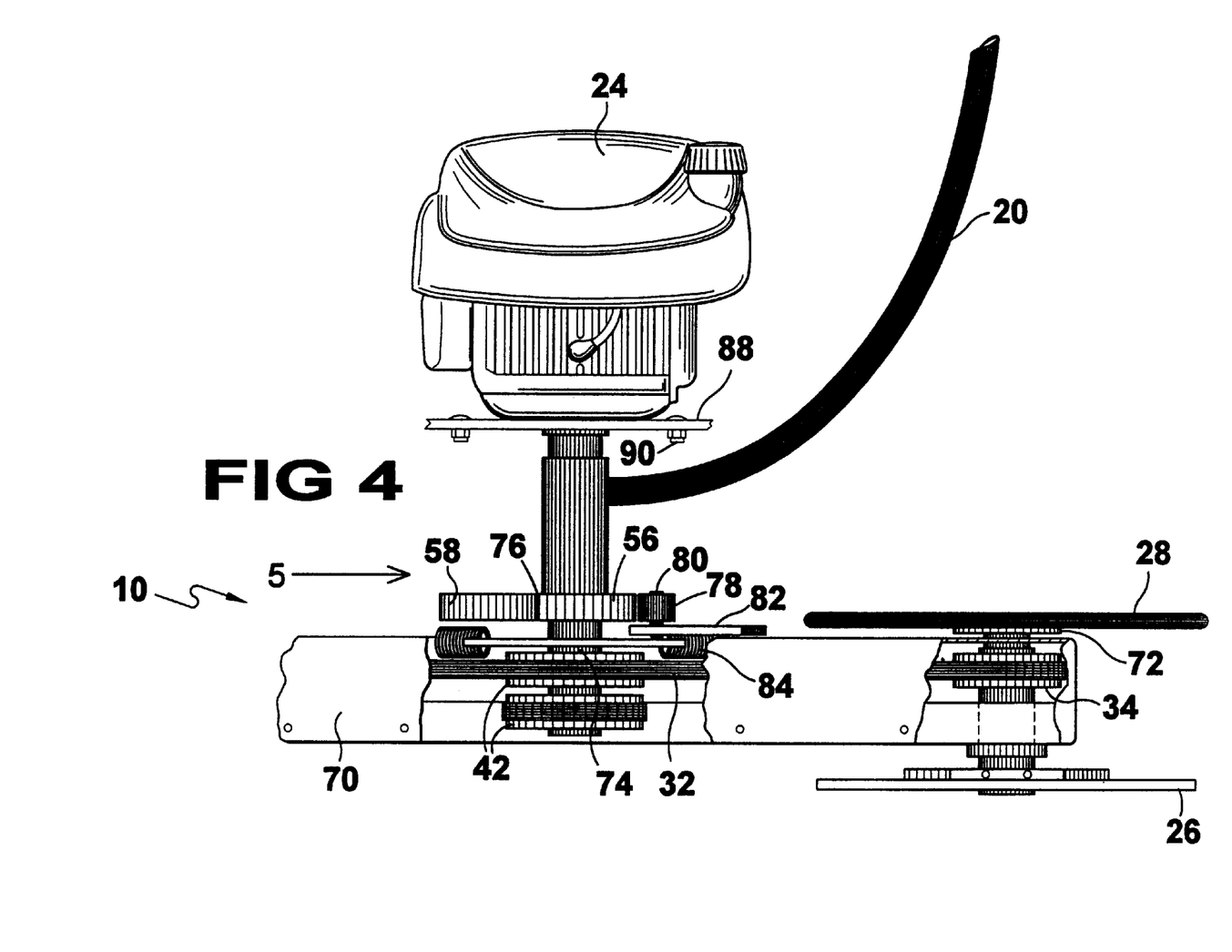
FIG. 4 is an elevational view of a portion of the trimmer arrangement and an engine for driving the trimmer by means of a roller cam, roller caster, springs, cross members, belts and pulleys as well as friction means to drive the guard ring.

Turning to FIG. 4, shown therein is an elevational view of a portion of the trimmer arrangement 10 and an independent internal combustion engine 24 with handle 20 for driving the trimmer 10 by means of belts 32 and pulleys 34 as well as blade 26 and guard ring 28. Shown is the trimmer assembly 10 with platform 70 having means for rotatably mounting 72, 74 underneath the blade pulleys 34 and the main drive pulleys 42. Also shown is the cam 56 with lobe 58 and position stop or trough 76 with roller 78. Position stop 76 is a trough between cam lobes wherein the roller gear 78 will position itself to prevent the trimmer 10 from freely rotating. Roller 78 is conventionally attached by means 80 to a movable plate member 82 which plate has a spring 84 thereon which spring urges the roller 78 toward cam 56 in order to securely position trimmer assembly 10. Also shown is a motor mounting base plate 88 having means for mounting 90 the motor 24 in a conventional manner, e.g., using a threaded nut and bolt. Motor base plate 88 fixedly connects to mounting means 54 (not shown) which is fixedly attached to platform 70.

Figure 5:
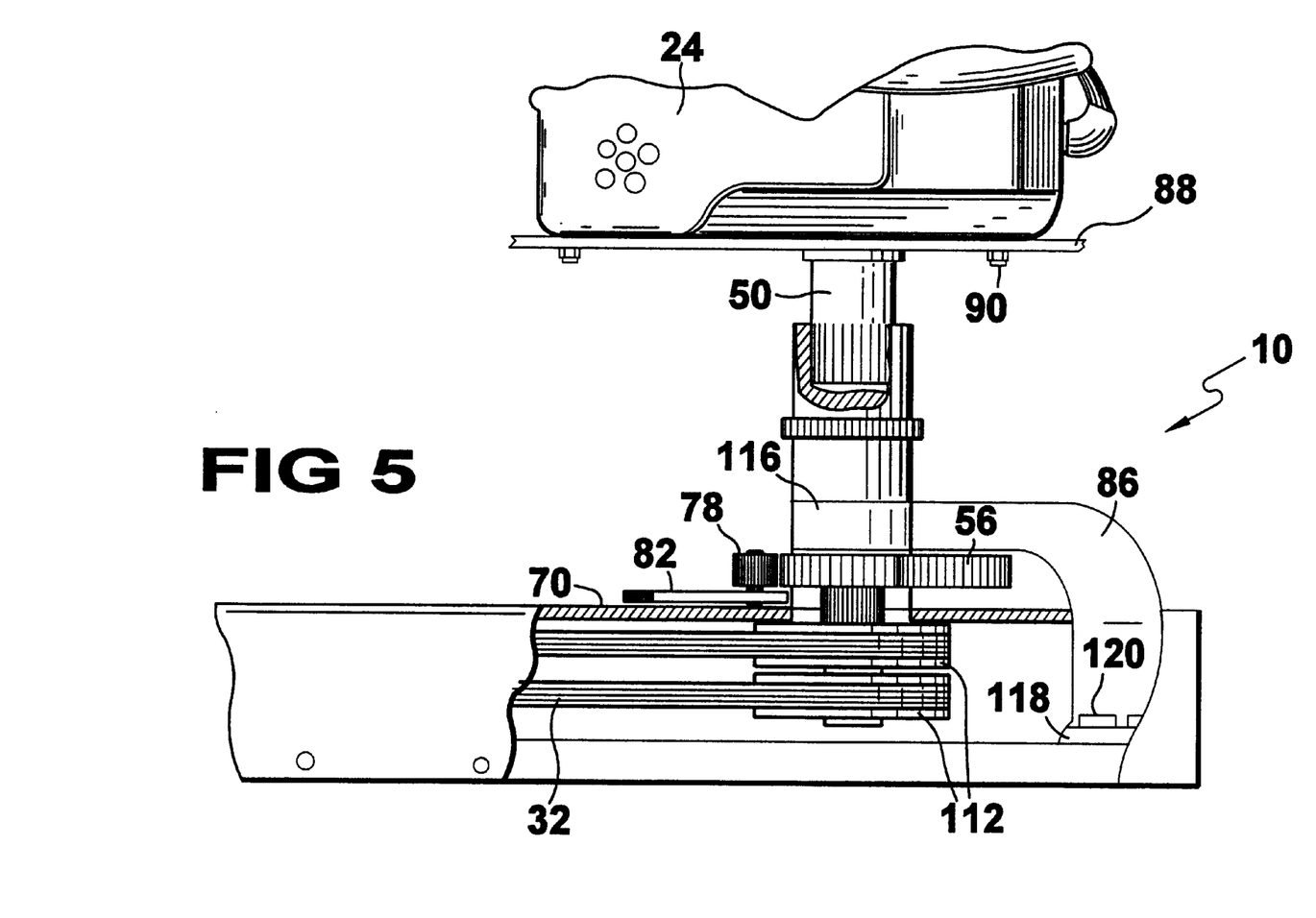
FIG. 5 is an elevation view taken generally in the direction indicated by the arrows in FIG. 4 to show the structure which supports the pulley spaced above the mounting base plate to permit easy belt changes.

Turning to FIG. 5, shown therein is an elevation view taken generally in the direction indicated by the arrows in FIG. 4 to show an alternative means and structure 86 which supports the motor 24 having a pulley 42 spaced below the platform 70 to permit easy belt 32 changes. Certain features previously disclosed are also shown. Arcuate member 86 has a generally upstanding collar 116 on one end along with a horizontal mounting plate 118 and fastener 120 for fixed attachment to platform 70.

Figure 6:
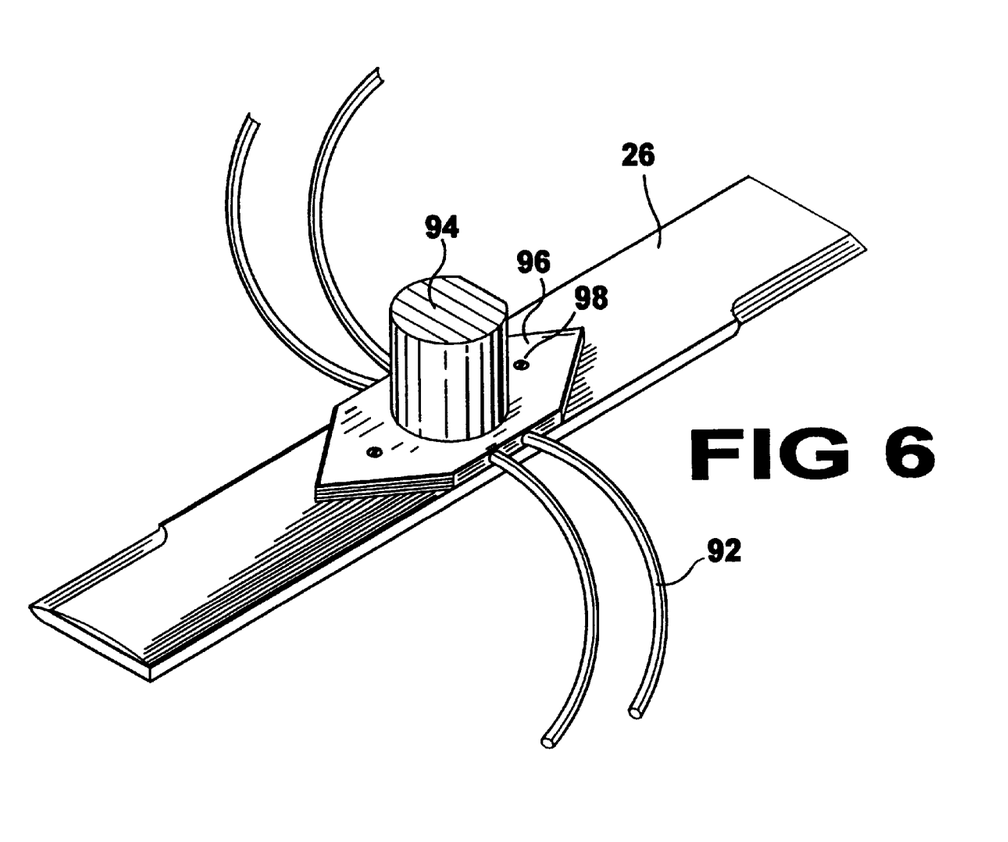
FIG. 6 is an enlarged perspective view of a typical trimmer blade assembly combined with flexible cutting cords.

Turning to FIG. 6, shown therein is an enlarged perspective view of a typical trimmer blade 26 assembly combined with flexible cutting cords or string 92. A rotatable blade shaft 94 having means for attachment 96 to blade 26, using e.g., threaded fasteners 98, is also shown.

Figure 7:
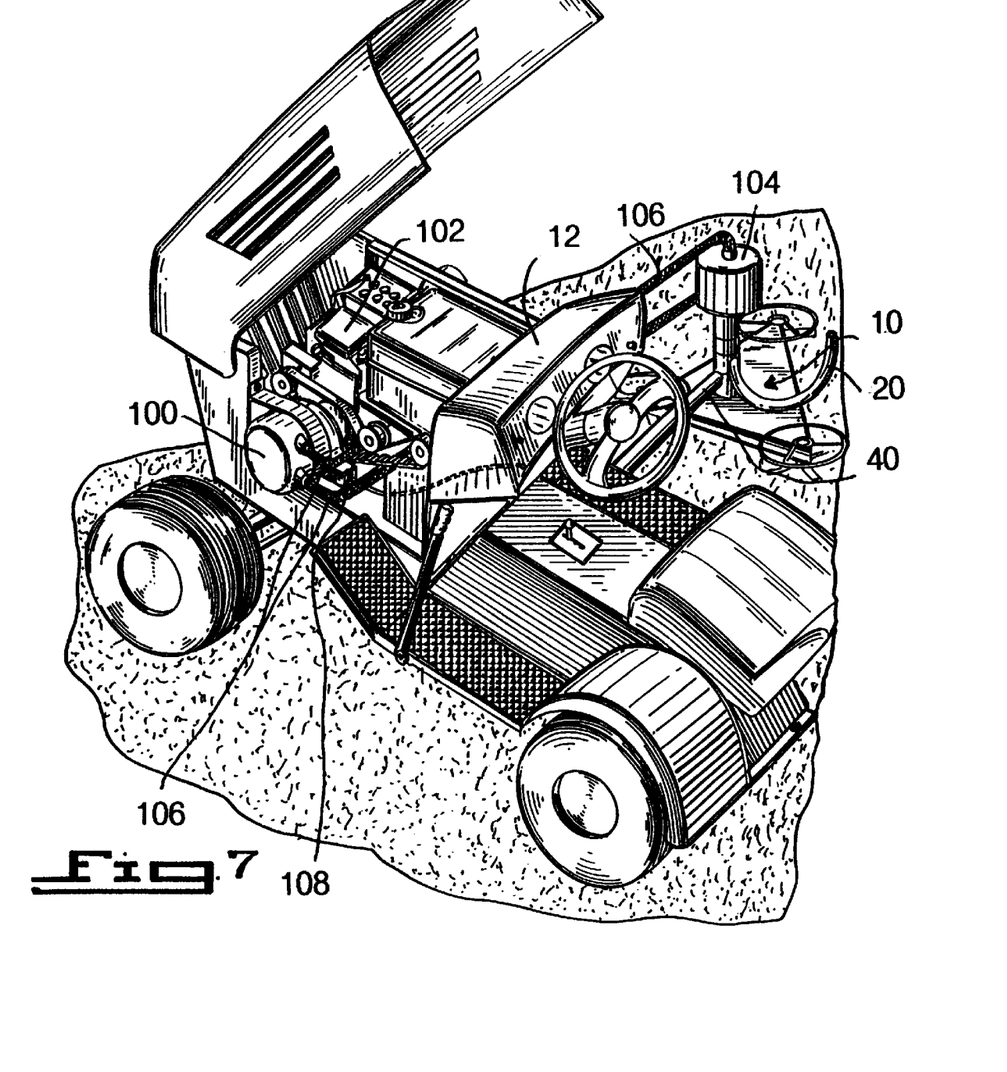
FIG. 7 is an alternate arrangement for driving the trimmer by means of a hydraulic pump driven by the tractor engine and adapted to cooperate with the hydraulic motor to drive the trimmer arrangement of the present invention.

Turning to FIG. 7, therein is shown is an alternate arrangement for driving the trimmer 10 by means of a hydraulic pump 100 driven by the tractor 12 engine 102 and adapted to cooperate having fluid connecting means 106, e.g., conduit, hose or pipe, with a hydraulic motor 104 to drive the trimmer 10 arrangement of the present invention. Certain features previously disclosed are also shown. Pump 100 has a conventional belt drive system 108 as would be done by one skilled in the art. Other features of the present invention 10 are the same as previously disclosed.

Figure 8:
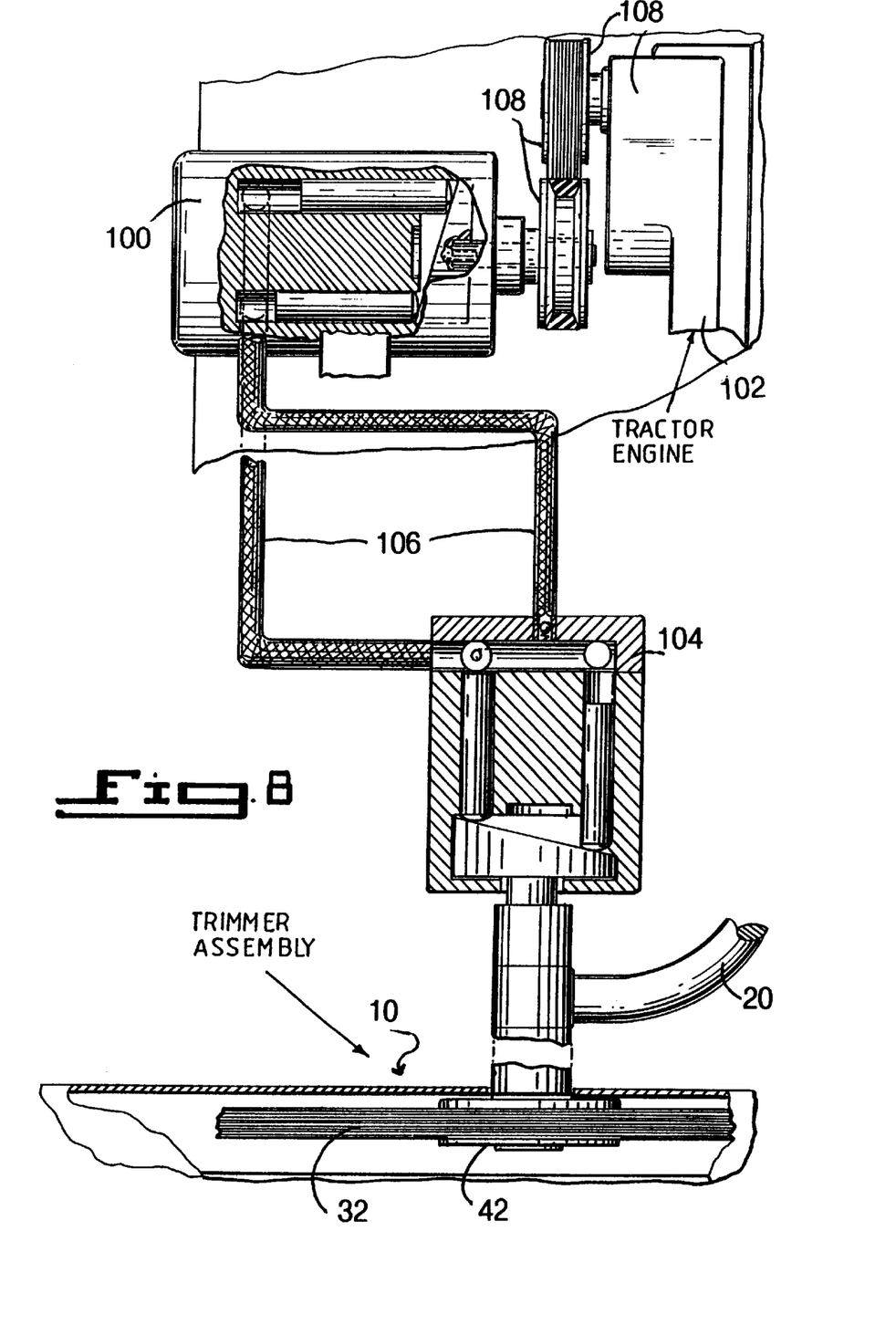
FIG. 8 is a schematic representation of the tractor mounted hydraulic swash plate and hydraulic linkage to the cooperating hydraulic swash plate motor arrangement to drive the trimmer arrangement as shown in FIG. 7.

Turning to FIG. 8, therein is shown a schematic representation of the tractor mounted hydraulic pump 100 with swash plate and hydraulic linkage 106 to the cooperating hydraulic motor 104 with swash plate arrangement to drive the trimmer arrangement 10 as shown in FIG. 7. Certain features previously disclosed are also shown.

I claim:

1. An apparatus for a rotatable trimmer assembly for trimming ground cover mounted on, and in combination with, a conventional lawn tractor, comprising:
   a) a generally flat platform;
   b) a plurality of rotatable cutting members attached to said platform;
   c) a first means for connecting said platform to the lawn tractor;
   d) a main rotatable drive shaft mounted on said platform;
   e) means for drivably connecting said plurality of rotatable cutting members to said main rotatable drive shaft;
   f) a motor means for rotating said rotatable drive shaft;
   g) means for mounting said motor means to said platform;
   h) a second means for rotatable connecting said platform to said first means for connecting said platform to the lawn tractor;
   i) said first means for connecting said platform to the lawn tractor further comprises a shaft extending transversally from the underside of the lawn tractor; and
   j) said shaft further comprising an outer shaft being hollow for receiving an inner shaft, said inner shaft being slidably movable inside said outer shaft, said outer shaft having means for tensioning said inner shaft outwardly from said outer shaft.

2. The apparatus of claim 1, wherein said platform is substantially triangularly shaped.

3. The apparatus of claim 2, wherein said plurality of rotatable cutting members are attached to the peripheral edge of said platform substantially positioned at each corner of said triangle.

4. The apparatus of claim 3, wherein said plurality of rotatable cutting members and said main rotatable drive shaft are disposed on the underside of said platform.

5. The apparatus of claim 1, wherein said means for drivably connecting said plurality of rotatable cutting members to said main rotatable drive shaft further comprises a plurality of belts and a plurality of pulleys.

6. The apparatus of claim 1, wherein said motor means further comprises an internal combustion engine, said internal combustion engine being independent of the lawn tractor.

7. The apparatus of claim 1, wherein said motor means further comprises a hydraulic motor, said hydraulic motor having fluid connection means to the engine of the lawn tractor, further comprising means for a hydraulic pump mounted on the engine of the lawn tractor.

8. The apparatus of claim 7, wherein said hydraulic motor and said hydraulic pump further comprise a swash plate.

9. The apparatus of claim 7, said fluid connection means further comprises a conduit.

10. The apparatus of claim 1, said means for mounting said motor means to said platform further comprises an upstanding housing having a bore therein, said bore for receiving said main rotatable drive shaft, said means for mounting being fixedly attached at its base to said platform, having a means for attaching said motor means to the top of said means for mounting.

11. The apparatus of claim 1, said means for mounting said motor means to said platform further comprises an arcuate member, said arcuate member having a generally upstanding collar on a first end for receiving said main rotatable drive shaft, further said arcuate member having a horizontal mounting plate on a second end for attachment to said platform.

12. The apparatus of claim 1, further comprising a pivotal coupling means fixedly attached to said platform, said pivotal coupling means sandwiched about said inner shaft having a fastening means for attachment of said pivotal coupling means to said inner shaft, whereby said platform can be pivoted from a generally horizontal position to a generally vertical position.

13. The apparatus of claim 2, said second means for rotatably connecting said platform to said first means for connecting said platform to the lawn tractor further comprises a generally horizontal cam fixedly attached to said first means for connecting said platform to the lawn mower, further comprising a roller member fixedly attached to said platform, said roller member communicating with said cam as said platform rotates.

14. The apparatus of claim 13, said cam further comprising multiple lobes having a trough between said lobes, said trough for receiving said roller member as said platform rotates.

15. The apparatus of claim 14, wherein said multiple lobes are three in number each said lobe corresponding to one side of the sides of said triangular platform.

* * * * *